(12) United States Patent
Ramesh Iyer et al.

(10) Patent No.: US 12,712,813 B2
(45) Date of Patent: Aug. 18, 2026

(54) PACKET PROCESSOR MEMORY RESERVATION

(71) Applicant: Arista Networks, Inc., Santa Clara, CA (US)

(72) Inventors: Anirudh Ramesh Iyer, Bangalore (IN); Lucas Maxime Frere, Cork (IE); Pavan Krishnamurthy, Bangalore (IN); Satish Kumar Selvaraj, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/896,696

(22) Filed: Sep. 25, 2024

(65) Prior Publication Data

US 2026/0089109 A1 Mar. 26, 2026

(51) Int. Cl.
*H04L 47/129* (2022.01)
*H04L 47/2416* (2022.01)

(52) U.S. Cl.
CPC ........ *H04L 47/129* (2022.05); *H04L 47/2416* (2013.01)

(58) Field of Classification Search
CPC .......................... H04L 47/129; H04L 47/2416
See application file for complete search history.

(56) References Cited

U.S. PATENT DOCUMENTS

| | | | | |
|---|---|---|---|---|
| 11,711,370 | B2 | 7/2023 | Ranjan et al. | |
| 2006/0262583 | A1* | 11/2006 | Venkatachary | G11C 15/00 711/108 |
| 2010/0074108 | A1* | 3/2010 | Olakangil | H04L 47/10 370/230 |
| 2014/0082176 | A1* | 3/2014 | Basso | G06F 16/90339 709/224 |
| 2018/0316627 | A1* | 11/2018 | Cui | H04L 47/808 |
| 2020/0099615 | A1* | 3/2020 | Mittal | H04L 45/74 |

* cited by examiner

*Primary Examiner* — Emmanuel L Moise
*Assistant Examiner* — Xiang Yu
(74) *Attorney, Agent, or Firm* — Treyz Law Group, P.C.; Tianyi He

(57) ABSTRACT

A network device may include packet processor memory circuitry and processing circuitry coupled to the packet processor memory circuitry. The processing circuitry may receive a set of network traffic processing features for which data is to be stored in the packet processor memory and may receive memory reservation parameters for the set of network traffic processing features. Based on the received information, the processing circuitry may obtain and maintain memory reservation layout information for the set of features.

20 Claims, 9 Drawing Sheets

74 76

| FEATURE | PRIORITY | (REQUESTED) DEPTH | ADJUSTED DEPTH | WIDTH | SCALE |
|---|---|---|---|---|---|
| FEATURE 34-1 | 3 | < 1(D) | 1(D) | 3(W) | 3(D)(W) |
| FEATURE 34-2 | 4 | < 1(D) | 1(D) | 1(W) | 1(D)(W) |
| FEATURE 34-3 | 2 | < 1(D) | 1(D) | 1(W) | 1(D)(W) |
| FEATURE 34-4 | 5 | < 1(D) | 1(D) | 2(W) | 2(D)(W) |
| FEATURE 34-5 | 1 | < 1(D) | 1(D) | 2(W) | 2(D)(W) |

PACKET PROCESSOR MEMORY RESERVATION

BACKGROUND

A communication system can include network devices that are interconnected to form a network for conveying network traffic from source devices to destination devices. A network device can map network traffic to corresponding action(s) to be performed on the network traffic. In particular, memory such as ternary content addressable memory on the network device can store entries to which network traffic is matched. Depending on the entry to which network traffic is matched, action(s) corresponding to the entry may be performed for the matching network traffic.

DETAILED DESCRIPTION

Figure 1:
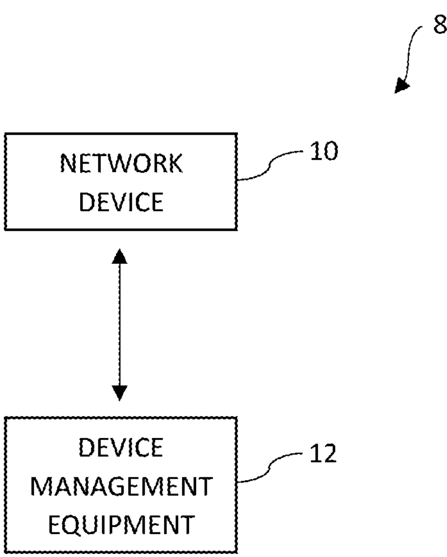
FIG. 1 is a diagram of an illustrative networking system having network device(s) communicatively coupled to external equipment in accordance with some embodiments.

A network may include numerous interconnected network devices that process network traffic in a desired manner (e.g., to implement a desired set of network policy rules). A network device may include memory circuitry, accessible by packet processor(s), such as one or more ternary content addressable memories (TCAMs) configured to store flow entries each specifying a set of matching criteria to which corresponding header information of received network traffic is compared (during lookup) and each specifying action (s) to be taken for any matching network traffic. Each matching criterion may be matched to a value of a corresponding header field in the received network traffic and/or a value of corresponding metadata generated for the received network traffic during upstream processing (e.g., lookup) stages of the packet processor prior to TCAM-based processing stage(s). To specify the types of header fields to which entries in the memory circuitry are compared and matched, the memory circuitry may be configured with a memory profile specifying a set of key fields (sometimes referred to as qualifiers or qualifier fields), combinations of which define different keys to which corresponding values in the header fields (and/or metadata fields) are matched. Network traffic processing features such as access control list (ACL) policy features, quality of service (QoS) policy features, policy-based routing (PBR) features, traffic mirroring policy features, traffic policing policy features, etc., may each define a different matching criteria using a different key (e.g., a different combination of key fields) and may each define different action(s) to implement the type of feature.

A packet processor memory (e.g., a TCAM) has a fixed physical structure (e.g., implemented as an array of memory slices sometimes referred to as memory tiles or memory blocks), thereby exhibiting certain physical and therefore configuration limitations. Because the packet processor memory is shared by different traffic processing features, the fixed structure needs to accommodate different numbers of entries for different types of traffic processing features, depending on user configuration. The number of entries and the number of key fields for each feature can differ across different features sharing the TCAM. Accordingly, it may be difficult to efficiently make use of the memory slices when accommodating features having varying characteristics. Additionally, memory allocation for the same set of features to the same packet processor memory can even vary in different contexts (e.g., depending on when and/or which memory slice(s) are allocated for each feature). For example, initially, network device processing circuitry may feasibly use memory portions in the memory for a set of features, but after a system reboot, the processing circuitry may determine that the same set of features can no longer feasibly use the memory (e.g., the processing circuitry attempts to allocate the memory to the features in a different manner than done initially). This may be an undesirable artifact of how processing circuitry (e.g., when executing software instructions) is configured to handle implementation of the features.

To mitigate these issues and generally improve the use of packet processor memory, a network device may include processing circuitry configured to perform memory reservation operations to reserve a memory portion for each network traffic processing feature. In illustrative configurations described herein as example, the memory reservation operations may identify the reserved memory portions for the features based on different reservation parameters such as feature (entry) width, feature depth, feature priority, etc., to more efficiently make use of the memory. The reserved memory portions may be maintained as part of a memory reservation layout. The processing circuitry may provide, as output, the memory reservation layout identifying the reserved memory portions for the features, or if reservation is not feasible using the current configuration information, an indication of reservation failure and a prompt for input of new configuration information (e.g., a new set of features, new reservation parameters, etc.). The use of memory reservation operations may help allocate memory in a more efficient and deterministic manner, among other advantages.

An illustrative networking system in which one or more network devices include processing circuitry configured to perform packet processor memory reservation (e.g., in the manner as described above) is shown in FIG. 1. In the example of FIG. 1, the networking system may include one or more components of a network such as network 8. Network 8 may have any suitable scope. As examples, network 8 may include, be, and/or form part of one or more local segments, one or more local subnets, one or more local area networks (LANs), one or more virtual local area networks (VLANs), one or more data center networks, one or more campus area networks, a wide area network, etc. Network 8 may include a wired network portion based on wired technologies or standards such as Ethernet (e.g., using copper cables and/or fiber optic cables) and, if desired, may include a wireless network portion such as one or more wireless local area networks (WLANs) (e.g., wireless networks compliant with the IEEE 802.11 family of standards) provided by wireless access point(s). If desired, network 8 may include internet service provider networks (e.g., the Internet) or other public service provider networks, private service provider networks (e.g., multiprotocol label switching (MPLS) networks), and/or other types of networks such as telecommunication service provider networks.

Network 8 may be implemented using and include one or more network devices that handle (e.g., process by switching, routing, forwarding, modifying, etc.) network traffic to convey information for user applications between end hosts and/or for other applications, services, and functions generally between devices (e.g., network devices and/or end host devices). Network 8 may include networking equipment forming a variety of network devices that interconnect end hosts of network 8. As examples, network devices of network 8 may include one or more wireless access points, one or more switches (e.g., single-layer (Layer 2) switches, multi-layer (Layer 2 and Layer 3) switches, etc.), one or more bridges, one or more routers, one or more gateways, one or more hubs, one or more repeaters, one or more firewalls, one or more devices serving other networking functions, one or more devices that include the functionality of two or more of these devices, and/or management equipment that manages and controls the operation of one or more of other network devices. One such network device of network 8, network device 10, is shown in the example of FIG. 1.

To manage the operations of network device 10, external equipment (external to network device 10), such as device management equipment 12, may be communicatively coupled to network device 10. As an example, equipment 12 may include administrator device(s). An illustrative administrator device may be a computing device (e.g., a laptop, a computer, etc.) operated by a network administrator (e.g., a user with administrative-level access to network 8, thereby allowing the user to access and manage network device configuration or other information stored locally on device 10). The computing device may include processing circuitry, memory circuitry, and input-output components (e.g., wireless communication circuitry, wired communication circuitry, and/or other circuitry that provide network interfaces to facilitate connectivity with network device 10, user input-output components such as a display, a keyboard, a mouse, etc. that provide user interfaces to facilitate the reception of user input and the providing of (user) output to the user).

As another example, equipment 12 may include a device and/or network management server (e.g., a server that provides management tools and/or services for managing network 8 and/or the network devices therein). The device management server may be implemented on server equipment. The server equipment may include server hardware such as one or more blade servers, one or more rack servers, and/or one or more tower servers. Compute devices and storage devices for implementing the functions of the server may be provided as part of the server hardware. The compute devices may include one or more processors or processing units based on any suitable processor architecture(s). The storage devices may include non-volatile memory, volatile memory, and/or other storage circuitry. The storage devices may include one or more non-transitory (tangible) computer-readable storage media that store the operating system software and/or any other software code. The compute devices may run (e.g., execute) an operating system and/or other software and firmware stored on the one or more non-transitory computer-readable storage media to perform the desired operations of the server (e.g., to provide the desired management tools and/or services). The server may include input-output components (e.g., wireless communication circuitry, wired communication circuitry, and/or other circuitry that provide network interfaces to facilitate connectivity with network device 10).

Depending on the network configuration, equipment 12 (e.g., network interfaces provided thereon) may be communicatively coupled to network device 10 via a direct cable connection (e.g., without other intervening network devices) or via intervening network device(s) (e.g., through one or more other network devices in network 8, through portions of network 8 such as the Internet, etc.).

Figure 2:
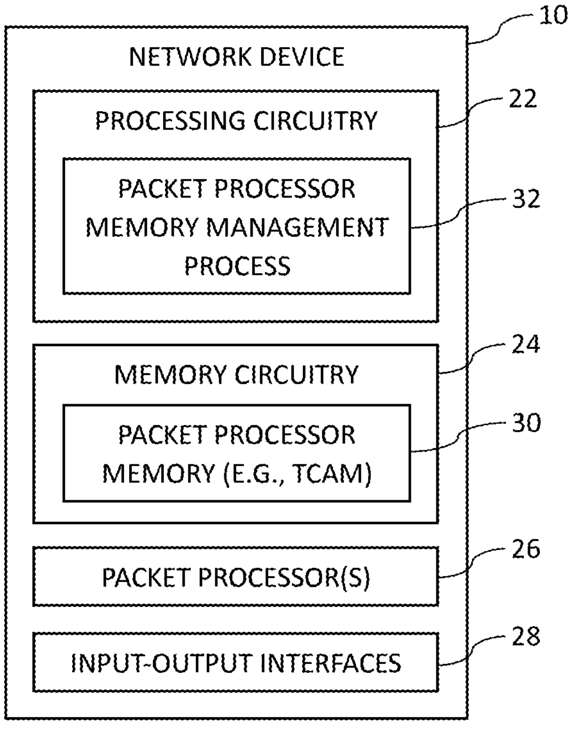
FIG. 2 is a diagram of an illustrative network device in accordance with some embodiments.

FIG. 2 is a diagram of an illustrative network device that may be used to implement any of the network devices in network 8 in FIG. 1, such as network device 10. As shown in FIG. 2, an illustrative network device 10 may include processing circuitry 22, memory circuitry 24, one or more packet processors 26, and input-output interfaces 28 (e.g., network interfaces implemented on exterior-facing ports). In one illustrative arrangement, network device 10 may be or form part of a modular network device system (e.g., a modular switch system having removably coupled modules usable to flexibly expand characteristics and capabilities of the modular switch system such as to increase ports, provide specialized functionalities, etc.). In another illustrative arrangement, network device 10 may be a fixed-configuration network device (e.g., a fixed-configuration switch having a fixed number of ports and/or a fixed hardware configuration).

Processing circuitry 22 may include one or more processors such as central processing units (CPUs), graphics processing units (GPUs), microprocessors, general-purpose processors, host processors, microcontrollers, digital signal processors, programmable logic devices such as field programmable gate array (FPGA) devices, application specific system processors (ASSPs), application specific integrated circuit (ASIC) processors, and/or other types of processors.

Processing circuitry 22 may run (e.g., execute) a network device operating system and/or other software (including firmware) that is stored on memory circuitry 24. Memory circuitry 24 may include one or more non-transitory (tangible) computer-readable storage media that store the operating system software and/or any other software code, sometimes referred to as program instructions, software, data, instructions, or code. As an example, network device control plane functions may be stored as (software) instructions on the one or more non-transitory computer-readable storage media (e.g., in portion(s) of memory circuitry 24 in network device 10). The corresponding processing circuitry (e.g., one or more processors of processing circuitry 22 in network device 10) may execute the respective instructions to perform the corresponding operations. Memory circuitry 24 may include non-volatile memory device(s) (e.g., solid-state drives, flash memories or other electrically-programmable read-only memories, hard disk drive storage devices, etc.), volatile memory device(s) (e.g., static or dynamic random-access memories), and/or other storage circuitry.

Processing circuitry 22 and (at least some portions of) memory circuitry 24 as described above may sometimes be referred to collectively as control circuitry (e.g., implementing a control plane of network device 10). Accordingly, processing circuitry 22 may sometimes be referred to as control plane processing circuitry 22.

In particular, processing circuitry 22 may execute network device control plane software such as operating system software, routing policy management software, routing protocol agents or processes, routing information base agents, and other control software, may be used to support the operation of protocol clients and/or servers (e.g., to form some or all of a communications protocol stack such as the Transmission Control Protocol (TCP) and Internet Protocol (IP) stack), may be used to support the operation of packet processor(s) 26, may store packet forwarding information, may execute packet processing software, and/or may execute other software instructions that control the functions of network device 10 and the other components therein.

Packet processor(s) 26 may be used to implement a data plane or forwarding plane of network device 10 and may therefore sometimes be referred to herein as data plane processor(s) 26 or data plane processing circuitry 26. Packet processor(s) 26 may include one or more processors such as programmable logic devices (e.g., field programmable gate array (FPGA) devices), application specific system processors (ASSPs), application specific integrated circuit (ASIC) processors, central processing units (CPUs), graphics processing units (GPUs), microprocessors, general-purpose processors, host processors, microcontrollers, digital signal processors, and/or other types of processors.

A packet processor 26 may receive incoming network packets via input-output interfaces 28 (and/or via device internal interfaces), parse and analyze the received network packets, process the packets based on packet forwarding decision data and/or in accordance with network protocol(s) or other traffic policy, and forward (or drop) the network packet accordingly.

To interact with external devices, external systems, and/or users, network device 10 may include input-output interfaces 28 formed from corresponding input-output devices (sometimes referred to as input-output circuitry or interface circuitry). Input-output interfaces 28 may include different types of communication interfaces such as Ethernet interfaces (e.g., formed from one or more Ethernet ports), optical interfaces (e.g., formed from optical modules containing optical transceivers), Bluetooth interfaces, Wi-Fi interfaces, and/or other network interfaces for connecting device 10 to the Internet, a local area network, a wide area network, a mobile network, generally network device(s) in these networks, and/or other computing equipment (e.g., end hosts, server equipment, administrator devices, etc.).

As an example, some input-output interfaces 28 (e.g., those based on wired communication) may be implemented on physical ports. These physical ports may be configured to physically couple to and/or electrically connect to corresponding mating connectors of external components or equipment (e.g., cables, pluggable optical transceiver modules, etc.). Different ports may have different form-factors to accommodate different cables, different modules, different devices, or generally different external equipment. As another example, some input-output interfaces 28 (e.g., those based on wireless communication) may be implemented using wireless communication circuitry (e.g., antennas, transceivers, radios, etc.).

To appropriately process network traffic (e.g., network packets), packet processor 26 may operate with memory circuitry 30 (sometimes referred to herein as packet processor memory 30 or packet processor memory circuitry 30) formed from a portion of memory circuitry 24 (e.g., distinct from the portion(s) of memory circuitry storing software instructions for processing circuitry 22). Packet processor 26 and memory circuitry 30 may be integrated as parts of the same integrated circuit die (or as parts of the same integrated circuit die package), and/or packet processor 26 and memory circuitry 30 may be formed from discrete components, as separate discrete processor and memory components (e.g., as a packet processor integrated circuit die (or die package) and a memory integrated circuit die (or die package)).

Packet processor 26 may process received network traffic based on comparing header information in the network traffic to flow entries in packet processor memory 30. Each entry may specify one or more matching criteria based on different header fields and one or more actions to be taken for the matching network traffic (e.g., the network traffic whose header information satisfies the one or more matching criteria).

To increase the speed at which network traffic is processed by packet processor 26 (e.g., the speed at which the corresponding flow entries are searched or looked up for a match by packet processor 26), packet processor memory 30 circuitry on which these flow entries are stored may be or include ternary content addressable memories (TCAMs). Configurations in which memory circuitry 30 includes TCAM(s) are sometimes described herein as an illustrative example. If desired, entries for network traffic matching may be stored in other types of packet processor memory circuitry in addition to or instead of TCAMs, depending on the desired type and/or speed of matching (e.g., if exact match is desired, if minimum speed requirements exist, etc.).

To manage the configuration of packet processor memory 30, processing circuitry 22 may include one or more processors configured to execute (software) instructions for implementing (e.g., executing) a packet processor memory management process 32, sometimes referred to as packet processor memory management agent 32. Configuration in which processing circuitry 22, when executing instructions for process 32, performs memory reservation operations for network traffic processing features are described herein as an example. As additional examples, processing circuitry 22, when executing instructions for process 32, may obtain a memory profile with which memory 30 is configured, may obtain network traffic processing features to be implemented on memory 30, may obtain (flow) entries for the features to be stored on memory 30, may configure memory 30 based on the memory profile, may provide data for the entries to memory 30 for storage, etc.

In general, processing circuitry 22 may be implemented, organized, and/or configured in any suitable manner to perform packet processor memory management as described herein (e.g., memory reservation operations for network traffic processing features). Accordingly, processing circuitry 22 may include any number of software-executing processors that execute any number of processes or agents instead of or in addition to process 32 to perform packet processor memory management. Accordingly, processing circuitry 22 may sometimes be described herein to perform these operations instead of specifically referring to the one or more agents, processes, and/or kernel executed and implemented thereon.

Figure 3:
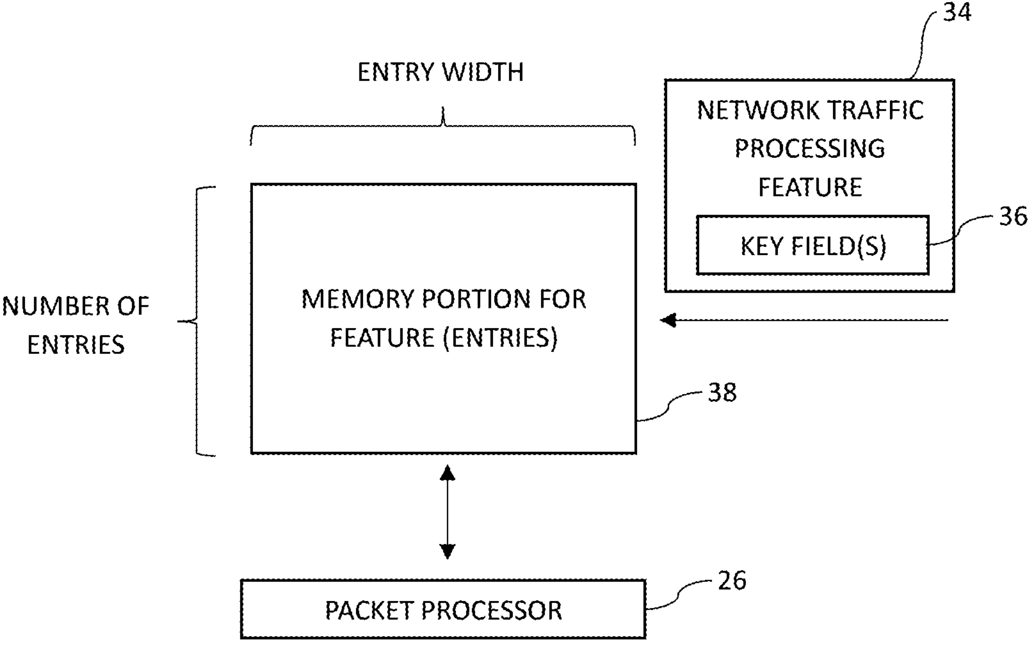
FIG. 3 is an illustrative memory portion for use by a network traffic processing feature and accessible by a packet processor in accordance with some embodiments.

A network traffic processing feature may be implemented by storing entries corresponding to the feature in a portion of packet processor memory and having packet processors perform corresponding actions for the features based network traffic matching the match criteria of the entries. FIG. 3 is a diagram of an illustrative memory portion for storing data for implementing a network traffic processing feature. As shown in FIG. 3, a network traffic processing feature 34 may identify or generally be associated with a set of key field(s) 36. In some instances, each (type of) feature may map to a predetermined set of key field(s). Processing circuitry 22 (FIG. 2) may identify the key field(s) for a feature by looking up the mapping between the feature and the key field(s). In other instances, the key fields may be specified with the feature.

Key fields 36 correspond to the header fields in network traffic (and/or metadata fields associated with the network traffic and generated by upstream processing stages of packet processor 26) that are compared with values of the entries in key fields 36 to determine whether the network traffic matches the entries for feature 34. Different actions can be taken for matching network traffic depending on the type of feature. As examples, traffic processing features such as traffic processing feature 34 may include access control list (ACL) policy features, quality of service (QoS) policy features, policy-based routing (PBR) features, traffic mirroring policy features, traffic policing policy features, and/or any other suitable (e.g., lookup-based) traffic processing features. Key fields such as the set of key field(s) 36 (e.g., corresponding to header fields in network traffic) may include a source MAC (Media Access Control) address, a destination MAC address, a source IP label (corresponding to a source IPv4 (Internet Protocol version 4) or IPv6 (Internet Protocol version 4) address header field), a destination IP label (corresponding to a destination IPv4 or IPv6 address header field), an inner VLAN ID (virtual local area network identifier), an outer VLAN ID, encapsulation header fields (e.g., Generic Routing Encapsulation (GRE) header fields), user-defined or vendor-specified header fields, etc., as just a few examples.

Prior to storing entries for a feature 34, a memory portion 38 (e.g., a portion of packet processor memory 30 such as a TCAM) may be allocated to store entries for feature 34.

Memory portion 38 may be allocated based on the number and size of key field(s) 36 which can determine the width of entries for feature 34. The size of each key field may be the number of bits occupied by the value of the key field (e.g., a source or destination MAC address field may have a size of 48 bits, a source or destination IPv4 address field with a 16-bit mask may have a size of 16 bits associated with the variable bits, etc.). The total number of bits for key field(s) 36 may be the entry width for entries of feature 34 (sometimes referred to as feature width or feature entry width).

Memory portion 38 may also be allocated based on the number of entries (expected) to be used by features 34. The expected number of entries may include the actual (initial) number of entries to be stored and/or space reserved to hold additional entries and provide other functionality for features 34.

Once memory portion 38 is allocated (e.g., by processing circuitry 22, when executing process 32) for use by feature 34, data for the entries of feature 34 may be written into memory portion 38. Accordingly, packet processor 26 may perform lookup operations using header information in network traffic as the key to determine whether the key matches any of the corresponding values in the key fields of any of the entries for feature 34. Because each entry for feature 34 identifies and/or is otherwise associated with one or more actions to be taken on matching network traffic, packet processor 26 may identify the one or more actions and take the one or more actions with the matching network traffic to implement feature 34.

Figure 4:
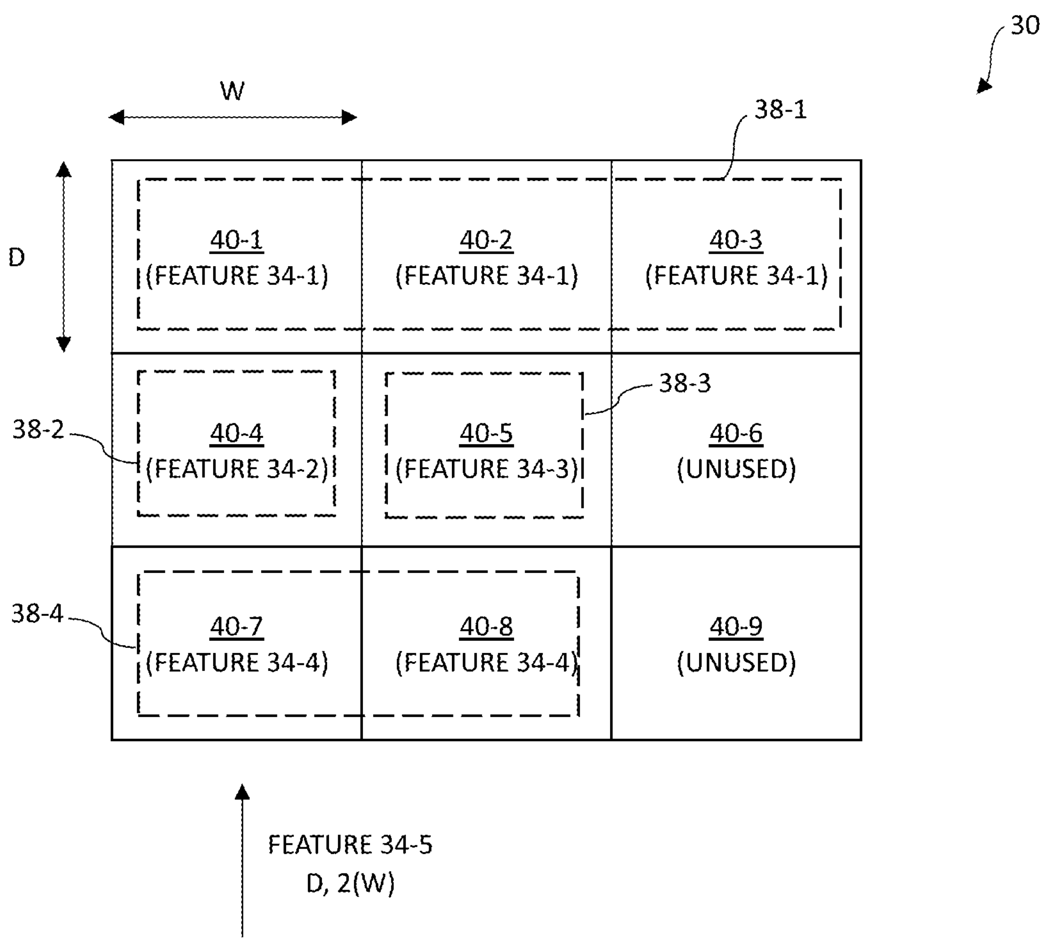
FIG. 4 is a diagram of illustrative packet processor memory circuitry having some memory tiles for use by features and some unused memory tiles in accordance with some embodiments.

Packet processor memory 30 such as a TCAM may be shared by multiple such as features 34 (e.g., multiple instances of feature 34 in FIG. 3). FIG. 4 shows an illustrative packet processor memory 30 for use by multiple features (e.g., having multiple memory portions therein to be used for storing entries for multiple features). Packet processor memory 30 may include multiple memory slices 40 (sometimes referred to as memory tiles 40 or memory blocks 40). In illustrative configurations described herein as an example, each memory slice 40 may represent a unit of memory allocation (e.g., a smallest unit of memory allocation for a feature). In the example of FIG. 4, memory 30 includes nine memory slices 40-1, 40-2, 40-3, 40-4, 40-5, 40-6, 40-7, 40-8, and 40-9. The number of memory slices in the example of FIG. 4 is merely illustrative. If desired, memory 30 may be implemented with any suitable number of memory slices 40 (e.g., 6 slices, 8 slices, 12 slices, etc.). While the example of FIG. 4 shows a 3-by-3 array of slices, this is merely illustrative. If desired, the array of memory slices may have any suitable configuration (e.g., be a 2-by-3 array, be a 3-by-2 array, be a 2-by-4 array, be a 4-by-3 array, etc.).

Each memory slice 40 may have a width W (sometimes referred to as a unit width W) and a depth D (sometimes referred to as a unit depth D). The width W may extend along a first dimension for providing space for key fields (e.g., bits for specifying key field values), and therefore for accommodating entry width (FIG. 3) for features. The depth D may extend a second (perpendicular) dimension for providing space for (e.g., accommodating) the number of entries for the features.

Because different features can have different requirements (e.g., different numbers of entries, different numbers and/or types of key fields, different scaling requirements, etc.), differently sized portions 38 of memory 30 may be allocated to each feature 34. In the example of FIG. 4, a first feature 34-1 may be allocated memory portion 38-1 containing memory slices 40-1, 40-2, and 40-3. A second feature 34-2 may be allocated memory portion 38-2 containing memory slice 40-4. A third feature 34-3 may be allocated memory portion 38-3 containing memory slice 40-5. A fourth feature 34-4 may be allocated memory portion 38-4 containing memory slices 40-7 and 40-8. Memory slices 40-6 and 40-9 may remain un-allocated or unused for features.

Memory 30 (e.g., memory slices 40 therein) may exhibit asymmetric characteristics because the horizontal dimension (along which width W is defined) provides space for values (e.g., bits) of key fields for entries of the features, while the vertical dimension (along which depth D is defined) provides space for the number of entries for the features. The use of the two dimensions is not interchangeable. Accordingly, features that require a number of bits for key fields that is greater than what can be accommodated by a single memory slice 40 (e.g., features that require a feature entry width (FIG. 3) greater than unit width W), such as features 34-1 and 34-4, may require multiple horizontally adjacent memory slices 40 (sometimes referred to as horizontal chaining of memory slices 40) to provide memory portions 38 for these features 34.

Features 34 that require a number of entries that is greater than what can be accommodated by a single memory slice 40 (e.g., features that require a number of entries (FIG. 3) greater than unit depth D) may require multiple vertically adjacent memory slices 40.

Because of these limitations, allocations of memory portions 38 for features 34 can be suboptimal. Still referring to the example of FIG. 4, while memory slices 40-6 and 40-9 remain unused and are allocatable to entries for additional features, they may not be able to accommodate certain additional features such as feature 34-5. In particular, feature 34-5 may require horizontal chaining of memory slices 40 because the desired entry width for feature 34-5 may be greater than unit width W (e.g., may be twice the unit width, '2(W)'). Because memory slices 40-6 and 40-9 are vertically adjacent, they cannot be horizontally chained to provide the memory portion for features 34-5. Accordingly, it may be desirable to optimize the configuration of memory 30 (e.g., the allocation of memory slices 40 to store multiple entries for multiple features).

Furthermore, allocation of memory portions 38 for features 34 can change over time (e.g., can be determined dynamically). In one illustrative example, when processing circuitry 22 (e.g., executing process 32) initially allocates memory portions 38 for features 34-1, 34-2, 34-3, 34-4, and 34-5 using memory slices 40-1, 40-2, 40-3, 40-4, 40-5, 40-6, 40-7, 40-8, and 40-9, memory 30 may have been able to accommodate all five features (e.g., using a layout different from that shown in FIG. 4). However, during a reset event for memory 30 (e.g., when device 10 perform a system update and/or system reset, when processing circuitry 22, process 32 executing thereon, and/or memory 30 experiences a reset due to a fault, etc.), processing circuitry 22 may re-perform an allocation process for features 34-1, 34-2, 34-3, 34-4, and 34-5 using memory 30. In this additional allocation process, processing circuitry 22 may arrive at the allocation layout in FIG. 4, thereby causing only four of the five features to be allocated within memory 30, even without any changes to feature and/or memory configuration. This change of memory allocation can reduce the reliability of network device operations. Accordingly, it may be desirable to provide a more robust and reliable mechanism for allocating memory portions of memory 30 for features.

Accordingly, network device 10 may be configured to perform memory reservation operations for allocating and reserving memory portions of packet processor memory circuitry for network traffic processing features. Configurations in which processing circuitry 22 (when executing process 32) performs the memory reservation operations are sometimes described herein as illustrative examples. If desired, other types of processors (e.g., dedicated hardware processors) and/or other components of device 10 may perform some or all of the memory reservation operations instead of or in addition to processing circuitry 22.

Figure 5:
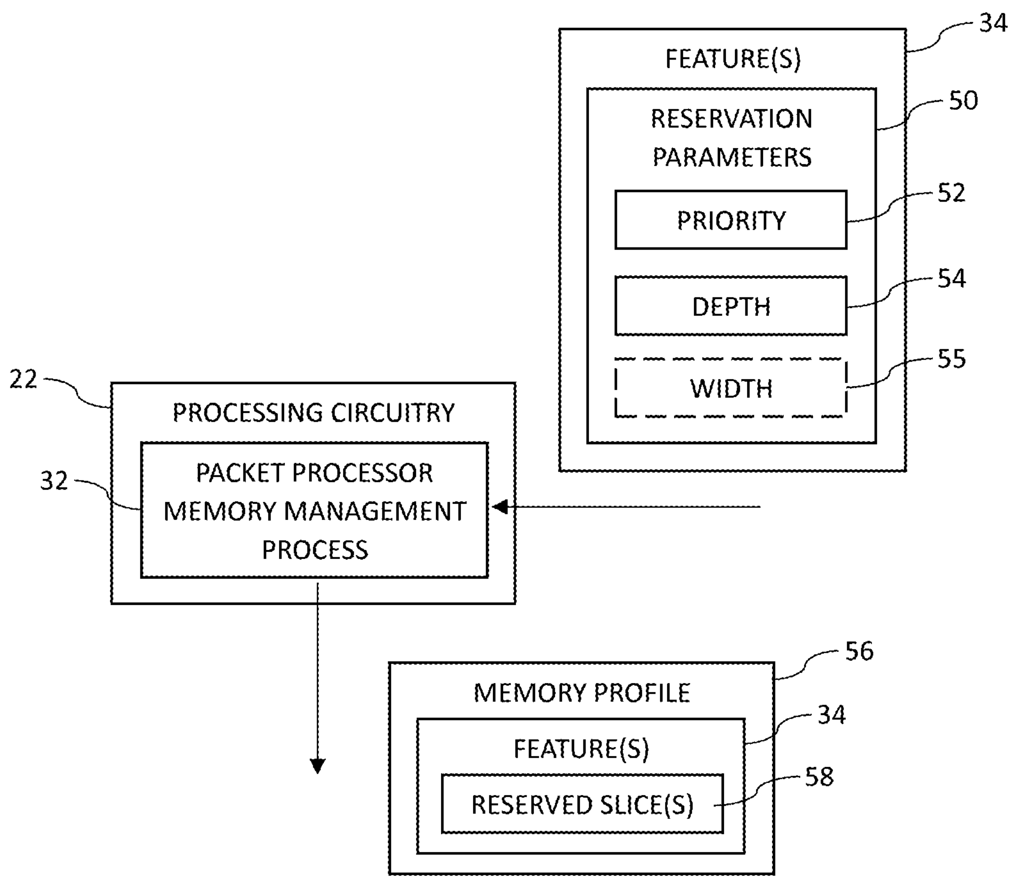
FIG. 5 is a diagram of illustrative processing circuitry configured to reserve memory portions of packet processor memory circuitry for use by features based on reservation parameters accompanying the features in accordance with some embodiments.

FIG. 5 is a diagram of illustrative network device processing circuitry 22 configured to perform memory reservation for traffic processing features. As shown in the example of FIG. 5, processing circuitry 22 (e.g., when executing process 32) may obtain a set of one or more features 34 each containing and/or indicative (e.g., indicative based on the type of feature) of key fields 36 (FIG. 3). Along with each feature 34 and/or in connection (e.g., in association) with each feature 34, a set of reservation parameters 50 (sometimes referred to as reservation information 50) for each feature 34 may also be obtained by processing circuitry 22.

Reservation parameters 50 may include any suitable information usable by processing circuitry 22 to perform memory reservation operations for features 34. In illustrative configurations described sometimes herein as examples, reservation parameters 50 may include an indication of feature priority 52 or generally priority information (e.g., a priority value indicative of the importance of the feature relative to other features), an indication of feature depth 54 or generally depth information (e.g., a number indicative of a number of entries to be used by the feature, or generally an indication of the number of entries expected to be stored in memory 30 for the feature during the lifetime of the feature), and/or an indication of feature (entry) width 55 or generally width information (e.g., received key fields 36 in FIG. 3 indicative of feature entry width, the type of feature or feature name based on which key fields can be determined via mapping, etc.).

Processing circuitry 22 (e.g., when executing process 32) may obtain feature information, including at least some reservation parameters 50, from a user (e.g., a network administrator) and/or from other sources as configuration input. As an example, device management equipment 12 (FIG. 1), when implemented as an administrator device, may be operated by a user to form a connection (e.g., a secure shell protocol (SSH) connection) with device 10 and provide the feature information through the administrator device and the corresponding connection. As another example, device management equipment 12 (FIG. 1), when implemented as a device management server, may generate or otherwise obtain the feature information (e.g., from a user through an administrator device connected to the server over the Internet). In particular, processing circuitry 22 may provide command line interface(s), application programming interfaces, and/or other types of (software) interfaces, through which processing circuitry 22 obtains input (e.g., the feature information as part of an input configuration) and provide output to other components of device 10 and/or equipment 12 external to device 10. Other components of device 10 such as communication paths (e.g., a communication bus), interfaces 28, and/or other interface circuitry may be used in conjunction with the software interface(s) to obtain input and/or provide output.

As examples, processing circuitry 22 may receive feature priority and feature depth as part of reservation configuration input, may receive the feature name, feature type, feature key fields as part of feature configuration input, and may generate other feature information feature width based on the configuration input (e.g., based on the feature type indicated in the feature configuration input).

Based on receiving or otherwise obtaining the feature information for features 34, processing circuitry 22 (e.g., when executing process 32) may generate or update a memory profile such as memory profile 56 for packet processor memory circuitry 30 (FIG. 2) stored on memory circuitry 24 (FIG. 2). Memory profile 56 may be generated or updated to include a memory reservation layout identifying reserved memory slices 58 (e.g., indications thereof) for each feature 34 for which feature information was obtained by processing circuitry 22. Memory profile 56 and the generated memory reservation layout therein may be stored by processing circuitry on memory circuitry 24. If desired, memory reservation layout information in profile 56 may include information other than a set of reserved memory slice(s) 48 for each feature 34, such as the feature name for each set of reserved memory slice(s) 48, any other feature information (e.g., received reservation parameters 50, key fields associated with feature 34, modified and/or generated reservation parameters, etc.), an indication of whether user requested features 34 and/or reservation parameters 50 are satisfied by the reservation layout (e.g., if less, or more, memory space is allocated for a particular feature than requested, if one or more (lower-priority) features are not allocated portion(s) of memory), etc.

When requested by external equipment (e.g., equipment 12) and/or based on generating the memory reservation layout information, processing circuitry 22 may provide output based on the memory reservation layout information in memory profile 56. As examples, processing circuitry 22 may provide the reserved slices 58 for feature(s) 34, may provide any other information for the feature(s) 34, may provide an indication of whether or not a reservation layout is generated and/or can be generated (e.g., is feasible for the obtained feature information), etc.

Processing circuitry 22 (e.g., when executing process 32) may perform a set of operations to deterministically allocate memory portions of packet processor memory circuitry 30 for network traffic processing features 34 to generate the corresponding memory reservation layout. In particular, the set of operations may optimize the memory reservation layout to reduce fragmentation (e.g., produce a more efficient layout that preferentially provides wider unused memory slices, where possible). Illustrative configurations in which processing circuitry 22 generates the memory reservation layout based on feature width (sometimes referred to as feature entry width or entry width) and feature priority are sometimes described herein as an example.

Figure 6:
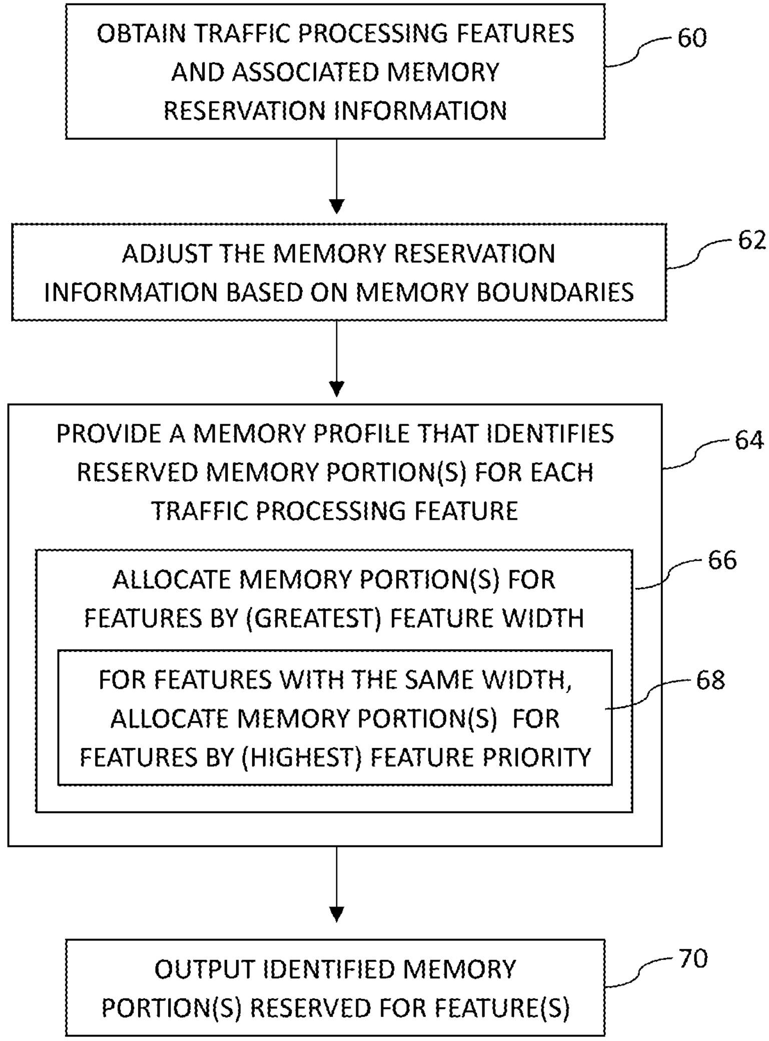
FIG. 6 is a flowchart of illustrative operations for reserving portions of packet processor memory circuitry for use by features in accordance with some embodiments.

FIG. 6 is a flowchart of illustrative operations for reserving memory portions for network traffic processing features based on feature width, feature priority, and/or other feature information. In particular, these operations may be performed by one or more processors of network device 10 (e.g., processing circuitry 22 in FIG. 2) using other components of network device 10 (e.g., memory circuitry 24, interfaces 28, etc., in FIG. 2). In some configurations described herein as an illustrative example, at least some of the operations described in connection with FIG. 6 may be performed by one or more processors (e.g., of processing circuitry 22) executing software instructions stored on memory circuitry (e.g., one or more non-transitory computer-readable storage media of memory circuitry 24). If desired, one or more operations described in connection with FIG. 6 may be performed by and/or using dedicated hardware processors of network device 10.

At block 60, network device processing circuitry (e.g., processing circuitry 22, when executing process 32) may obtain traffic processing features and associated memory reservation information (e.g., reservation parameters). As an example, the processing circuitry may obtain the feature information described in connection with FIG. 5 for each feature to be allocated memory slices in packet processor memory. The feature information may include feature priority information 52 in FIG. 5 (e.g., indicating a relative importance of the feature relative to other features), feature depth information 54 in FIG. 5 (e.g., indicating a number of entries expected to be stored for the feature), and feature width information 55 in FIG. 5 (e.g., indicating an entry width for entries of the feature, as determined by key fields 36 in FIG. 3 of the feature and/or as determined by the type of feature), as just a few examples. Unlike priority and depth, width 55 of feature 34 may be determined by the processing circuitry rather than being received as a received feature configuration input or reservation configuration input.

At block 62, the processing circuitry may adjust the memory reservation information based on memory boundaries of the packet processor memory. As shown in the example of FIG. 4, packet processor memory 30 may have boundaries for memory slices (e.g., defining the unit depth and the unit width of memory slices 40). Memory reservation parameters such as feature depth and/or feature width (e.g., as provided and requested by a user) may not be perfectly aligned with the boundaries for memory slices 40. As an example, a requested feature 34 may be expected to support 300 entries (e.g., as indicated by the received reservation parameters), while each slice 40 may have a unit depth of 512 entries. Accordingly, rather than allocating a memory portion for this feature to support 300 entries, the processing circuitry may adjust the requested 300 entries to be 512 entries, e.g., to be more consistent with the delineation between memory slices 40.

This example in which the number of entries is rounded up during adjustment is merely illustrative. If desired, the number of entries may be rounded down during adjustment. As another example, a requested feature 34 may be expected to support 300 entries, while each slice 40 may have a unit depth of 256 entries. Because the number of expected entries exceeds the unit depth of a memory slice (or the combined depths of an integer multiple of memory slice(s)) by less than a threshold amount (e.g., by less than 50%, by less than 25%, by less than 10%, etc.), rather allocating multiple memory slices for this feature to support 300 entries, the processing circuitry may adjust the requested 300 entries to be 256 entries, e.g., in order to save a slice that can be used to accommodate other features. If desired, step 62 may be omitted (e.g., when the obtained memory reservation information is already consistent with the memory boundaries).

At block 64, the processing circuitry may provide (e.g., generate, receive and the modify, etc.) a memory profile that identifies reserved memory portion(s) for each traffic processing feature. The processing circuitry may determine and identify the reserved memory portions based on the memory reservation parameters (e.g., based on at least some reservation parameters that have been adjusted at block 62 and/or based on at least some reservation parameters that are unadjusted and are as obtained at block 60) to perform memory reservation and generate a memory reservation layout.

In illustrative configurations described herein as an example, the processing circuitry may allocate memory portions for features in order of feature width (at block 66). In particular, the processing circuitry may first allocate a first memory portion (e.g., a memory portion formed from the first available memory slice(s) that satisfy the feature width) for a feature with the greatest feature width, then allocate a second memory portion for a feature with the second greater feature width, and so on, until the processing circuitry allocates the last memory portion for a feature with the smallest feature width.

In the scenarios in which multiple features have the same feature width, the processing circuitry may then allocate memory portions for the features with the same feature width by feature priority (at block 68). In particular, the processing circuitry may first allocate a memory portion formed from the first available memory slice(s) that satisfy the feature width for a first feature with the same feature width having the highest priority, then allocate a second memory portion for a feature with the same feature width having the second highest priority, and so on, until the processing circuitry allocates the last memory portion for a feature of the same feature width having the lowest priority.

By performing the operations described in connection with blocks 66 and 68, the processing circuitry may perform memory reservation (at block 64) in a deterministic manner (e.g., dictated by feature width and feature priority), thereby providing robust and consistent memory allocation. The processing circuitry may then store this memory allocation as a memory reservation layout (identifying the reserved memory portions for features) in other memory circuitry (e.g., a portion of memory circuitry 24 accessible and used by processing circuitry 22 to configure memory 30). The processing circuitry may generate a memory profile with the generated memory reservation layout or otherwise associate an existing memory profile with the generated memory reservation layout.

While illustrative configurations in which feature width and feature priority are used to allocate memory portions for traffic processing features are sometimes described herein as an example, this is merely illustrative. If desired, the processing circuitry may perform memory allocation based on other input(s) instead of or in addition to feature width and/or features priority.

The processing circuitry may perform numerous types of actions based on the memory profile (e.g., based on the memory reservation layout information therein). As one illustrative example, the processing circuitry may provide output based on the memory reservation layout information, or more specifically, provide output containing one or more memory portions reserved for one or more corresponding features (e.g., as indicated in the generated memory reservation layout). If desired, this memory reservation information may be output by the processing circuitry in response to a request (e.g., a command line interface command requesting reserved memory portion(s) for feature(s) identified in the command), and/or may be output by the processing circuitry responsive to successfully generating the memory reservation layout without receiving additional user commands.

The outputting of reserved memory portions for different features is only one illustrative example for the use of the memory reservation information. If desired, the processing circuitry may configure or otherwise set up memory circuitry 30 to store feature entries based on the memory reservation layout (e.g., with or without outputting the reserved memory portions to a user). If desired, the processing circuitry may request additional input (e.g., from the user) based on the generated memory reservation layout (e.g., request user input or confirmation on whether the layout is satisfactory, acceptable, should be changed, etc.).

The operations described in connection with FIG. 6 are merely illustrative. If desired, some operations may be omitted and/or other operations may be additional performed in connection with FIG. 6.

Figure 7:
FIG. 7 is a table of an illustrative set of features and corresponding memory reservation information in accordance with some embodiments.

FIG. 7 is a diagram of an illustrative table 72 containing reservation parameters for a set of network traffic processing features obtained (e.g., received and/or generated) by network device processing circuitry 22 (e.g., FIG. 2) as part of memory reservation operations for the features. In particular, processing circuitry 22 may receive a first set of reservation parameters 74 such as the feature (e.g., the type of feature, the feature name, one or more default key fields 36 in FIG. 3 associated with type of feature or the feature name and/or other key fields 36 in FIG. 3, and/or other information received as part of feature 34 in FIG. 5), the feature priority (e.g., indication of priority 52 in FIG. 5), and the requested feature depth (e.g., indication of feature depth 54 indicative of a number of entries requested or desired for the feature).

Additionally, based on the first set of reservation parameters and/or other information, processing circuitry 22 may generate, determine, identify, and/or otherwise obtain a second set of reservation parameters 74 such as the adjusted depth (e.g., the same as or different than the requested depth), the feature width (e.g., determined based on the combined sizes of the key fields, which may be mapped from the feature type or feature name), and the scale for the feature (e.g., a total area or space of memory allocation for the feature).

In the example of FIG. 7, feature information (including memory reservation parameters) for five features, such as the five features for which memory allocation is attempted in the example of FIG. 4, is shown in table 72. In particular, processing circuitry 22 (e.g., when executing process 32) may receive indication(s) of feature 34-1 (e.g., a feature type of feature 34-1, a feature name of feature 34-1, one or more key fields for feature 34-1, etc.), may obtain an indication of priority of feature 34-1 (e.g., a priority value of '3' in table 72), and may receive an indication of feature depth (e.g., a number of expected entries indicative of feature depth requested by a user or management equipment such as a number less than one unit depth D of memory slice 40 (i.e., '<1(D)' in table 72)).

In an analogous manner, processing circuitry 22 may receive indications of feature 34-2, indications of feature 34-3, indications of feature 34-4, and indications of feature 34-5. In an analogous manner, processing circuitry 22 may receive an indication of priority of feature 34-2 (e.g., a priority value of '4' in table 72), an indication of priority of feature 34-3 (e.g., a priority value of '2' in table 72), an indication of priority of feature 34-4 (e.g., a priority value of '5' in table 72), and an indication of priority of feature 34-5 (e.g., a priority value of '1' in table 72). In an analogous manner, processing circuitry 22 may receive an indication of feature depth for each of features 34-2, 34-3, 34-4, and 34-5. In the example of FIG. 7, the received indications of feature depths for features 34-1, 34-2, 34-3, 34-4, and 34-5 may be the same or different number(s) less than one unit depth D of memory slice 40 (i.e., '<1(D)' in table 72). In other examples, one or more features may have feature depths greater than one unit depth D.

Processing circuitry 22 may determine (e.g., generate) an adjusted feature depth by adjusting the received feature depth based on the structure of memory 30 (e.g., by performing the operations described in connection with block 62 of FIG. 6 based memory slice boundaries of memory 30). In particular, in the example of FIG. 7, because the requested depth of each of features 34-1, 34-2, 34-3, 34-4, and 34-5 is less than the unit depth D, each of the requested depths may be adjusted (e.g., rounded up) to be the unit depth D (i.e., '1(D)' in table 72).

Processing circuitry 22 may also determine a feature width for each feature 34. In particular, the feature width may be determined by the type of feature being implemented and/or key fields that are associated with the type of feature. As examples, processing circuitry 22 may access a stored mapping of features to key fields or otherwise obtain key fields for the feature (e.g., as input information from a user or generally as feature configuration input). Based on determining types of key fields and accordingly the size (e.g., width) of the key fields, processing circuitry 22 may determine a corresponding feature width needed to accommodate the combined sizes of the key fields associated with the feature.

In the example of FIG. 7, processing circuitry 22 may determine that flow entries for feature 34-1 may be implemented using a width of three times the unit width W of memory slice 40 (i.e., '3(W)' in table 72) because feature 34-1 may include entries that are defined by a larger number of key fields and/or larger-sized key fields (relative to the other features in the example of FIG. 7). In an analogous manner, processing circuitry 22 may determine that feature 34-2 (e.g., data entries therefor) should be allocated a memory portion having a width of a single unit width W (i.e., '1(W)' in table 72), that feature 34-3 (e.g., data entries therefor) should be allocated a memory portion having a width of a single unit width W (i.e., '1(W)' in table 72), that feature 34-4 (e.g., data entries therefor) should be allocated a memory portion having a width of twice the unit width W (i.e., '2(W)' in table 72), and that feature 34-5 (e.g., data entries therefor) should be allocated a memory portion having a width of twice the unit width W (i.e., '2(W)' in table 72).

Processing circuitry 22 may also determine a scale of each feature 34 based on the feature depth (e.g., the adjusted feature depth) and the feature width. In particular, processing circuitry 22 may determine the feature scale by multiplying the feature depth by the feature width to determine the feature scale, which serves as an indication of the memory area (e.g., a number of memory slice(s)) to be allocated to the feature. In the example of FIG. 7, processing circuitry 22 may determine that feature 34-1 has a scale of three memory slices 40 (i.e., '3(D)(W)' in table 72), that feature 34-2 has a scale of one memory slice 40 (i.e., '1(D)(W)' in table 72), that feature 34-3 has a scale of one memory slice 40 (i.e., '1(D)(W)' in table 72), that feature 34-4 has a scale of two memory slices 40 (i.e., '2(D)(W)' in table 72), that feature 34-5 has a scale of two memory slices 40 (i.e., '2(D)(W)' in table 72).

In illustrative configuration sometimes described herein as examples, the (collective) scale of features 34 may be used by processing circuitry 22 to determine whether the combination of features 34 can be feasibly allocated, and the adjusted depth, width, and priority information of features 34 may be used by processing circuitry 22 to determine how to allocate memory slices 40 (e.g., which of slices 40 to allocate) to each feature 34 to generate the memory reservation layout.

The information described in connection with FIG. 7 (e.g., information 74 and 76) may be stored in memory circuitry (e.g., memory circuitry 24 in FIG. 2) as part of memory reservation information (e.g., in memory profile 56 in FIG. 5) and may be provided, upon user request and/or as informational output, by the processing circuitry.

Figure 8:
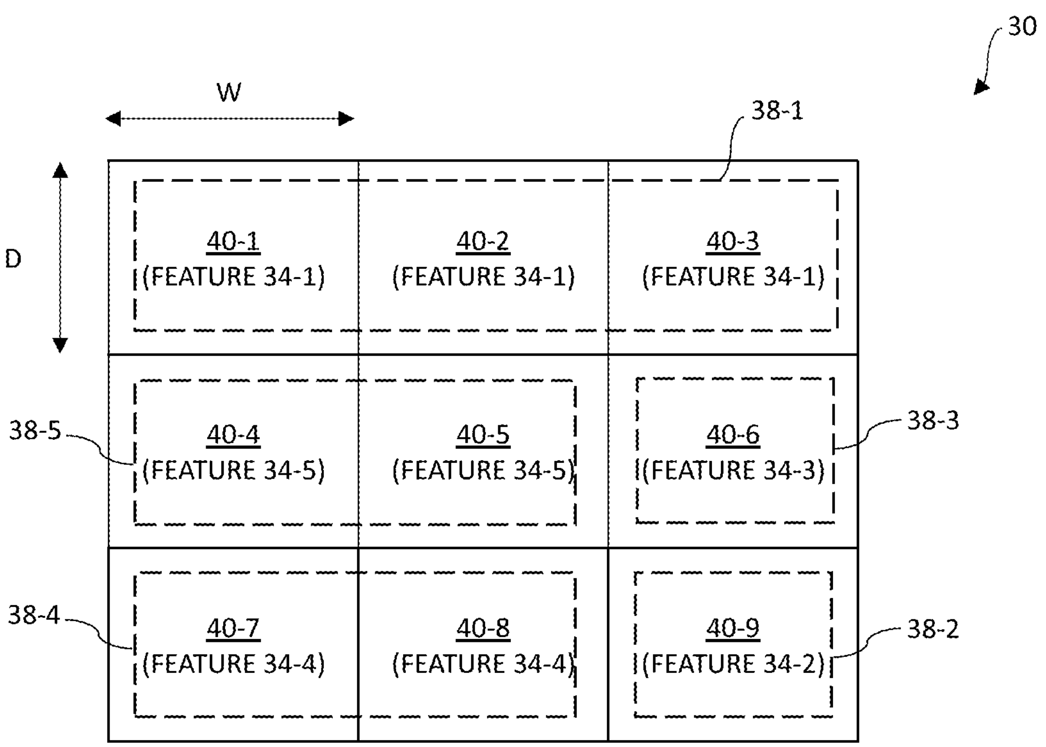
FIG. 8 is a diagram of illustrative packet processor memory circuitry with memory tiles more efficiently reserved for use by features in accordance with some embodiments.

FIG. 8 is a diagram of illustrative packet processor memory circuitry having memory slices allocated to different network traffic processing features based on illustrative memory reservation operations. In particular, in the example of FIG. 8, memory circuitry 30 (e.g., the same underlying memory circuitry 30 shown in FIG. 4) may have memory slices 40 that are allocated to features 34-1, 34-2, 34-3, 34-4, and 34-5 based on at least some of the operations described in connection with FIGS. 5-7.

Prior to generating the memory reservation layout shown in FIG. 8, processing circuitry 22 (e.g., executing process 32) may obtain information 74 and information 76 (FIG. 7) for each of features 34 (e.g., at least in part by performing the operations described in connection with blocks 60 and 62 in FIG. 6 and in connection with FIG. 7). After obtaining the relevant reservation information 74 and 76, processing circuitry 22 may perform the operations described in connection with block 64 (e.g., in connection with blocks 66 and 68) in FIG. 6.

When performing the memory reservation operations, processing circuitry 22 may identify groups of features 34 having the same feature width (e.g., as part of the operations described in connection with block 64 and/or prior to the operations described in connection with block 66). In particular, based on the information in table 72 (FIG. 7) obtained by processing circuitry 22, processing circuitry 22 may identify a first group of feature(s) such as feature 34-1 having a width of three times the unit width D, may identify a second group of feature(s) such as features 34-4 and 34-5 having a feature width of two times the unit width D, and may identify a third group of feature(s) such as features 34-2 and 34-3 having a feature width of one unit width D.

Accordingly, based on the operations described in connection with block 66, processing circuitry 22 may allocate memory slices 40 for features in the first group having the greatest feature width. In this example, the first group includes only feature 34-1 to be allocated a memory portion having a width of three memory slices 40. Processing circuitry 22 may therefore allocate the first available set of three horizontally chained memory slices, memory slices 40-1, 40-2, and 40-3 as shown in FIG. 8, to feature 34-1.

Processing circuitry 22 may subsequently allocate the remaining memory slices 40 for features in the second group having the second greatest width. In this example, the second group of feature(s) includes features 34-4 and 34-5 to be allocated with memory portions having a width of two memory slices 40. Based on the second group of features including multiple features, processing circuitry 22 may further allocate memory portions in order based on feature priority such as feature priority information in table 72 of FIG. 7 (e.g., obtained as configuration input as described in connection with FIG. 5).

As indicated by table 72, within the features of the second group, feature 34-5 with a priority value of '1' may have a higher priority than feature 34-4 with a priority value of '5' (e.g., using a priority convention based on an integer scale of 1 to 5, in which '1' indicates highest priority and '5' indicates lowest priority). Based on the operations described in connection with block 68, processing circuitry 22 may allocate the remaining memory slices 40 for features in the second group in order of priority. In this example, processing circuitry 22 may first allocate the first available set of two horizontally chained memory slices 40 of the remaining unallocated memory slices (e.g., memory slices 40-4 and 40-5 in FIG. 8) to feature 34-5.

Processing circuitry 22 may then allocate the first available set of two horizontal memory slices 40 of the remaining unallocated memory slices (e.g., memory slices 40-7 and 40-8 in FIG. 8) to feature 34-4.

When allocating memory slices for feature 34-4, while the next available memory slice 40-6 is not yet allocated, memory slice 40-6 cannot be used for feature 34-4 at least because memory slice 40-6 cannot be horizontally chained with another unallocated memory slice to provide the desired width for feature 34-4. As such, memory slices 40-7 and 40-8 are the first available set of two horizontally chained memory slices of the remaining unallocated memory slices to be allocated to feature 34-4.

Processing circuitry 22 may subsequently allocate the remaining memory slices 40 for features in the third group having the third greatest width (i.e., the smallest width in this example). In this example, the third group of feature(s) includes features 34-2 and 34-3 to be allocated with memory portions having a width of one memory slice 40. Based on the third group of features including multiple features, processing circuitry 22 may further allocate memory slices in order based on feature priority such as feature priority information in table 72 of FIG. 7 (e.g., obtained as configuration input as described in connection with FIG. 5).

As indicated by table 72, within the features of the third group, feature 34-3 with a priority value of '2' may have a higher priority than feature 34-2 with a priority value of '4' (e.g., using a priority convention based on an integer scale of 1 to 5, in which '1' indicates highest priority and '5' indicates lowest priority). Based on the operations described in connection with block 68, processing circuitry 22 may allocate the remaining memory slices 40 for features in the third group in order of priority. In this example, processing circuitry 22 may first allocate the first available memory slice 40 of the remaining unallocated memory slices (e.g., memory slice 40-6 in FIG. 8) to feature 34-3. Processing circuitry 22 may then allocate the first available memory slice 40 of the remaining unallocated memory slice(s) (e.g., memory slice 40-9 in FIG. 8) to feature 34-2.

In such a manner (e.g., when perform memory allocation based on the operations described in connection with FIGS. 5-8), the same set of features 34-1, 34-2, 34-3, 34-4, and 34-5 may be allocated to memory circuitry 30 having memory slices 40-1, 40-2, 40-3, 40-4, 40-5, 40-6, 40-7, 40-8, and 40-9 in a more optimal manner when compared to the allocation described in connection with FIG. 4. Additionally, the operations described in connection with FIGS. 5-8 provides a more deterministic manner of memory allocation and allows for the storage of the memory reservation layout as part of the memory profile, thereby providing a consistent memory reservation layout even across processing circuitry, packet processor, and/or system resets.

While a priority convention based on an integer scale of 1 to 5, in which '1' indicates highest priority and '5' indicates lowest priority, is sometimes described herein (e.g., in connection with FIGS. 7 and 8), this convention is merely illustrative. If desired, other priority conventions may be used. For example, a priority convention based on an integer scale of 1 to 5, in which '5' indicates highest priority and '1' indicates lowest priority, may be used. Using this example, in table 72 of FIG. 7, feature 34-1 may have a priority value of '3', feature 34-2 may have a priority value of '2', feature 34-3 may have a priority value of '4', feature 34-4 may have a priority value of '1', and feature 34-5 may have a priority vale of '5' (e.g., to arrive at the layout described in connection with FIG. 8).

Figure 9:
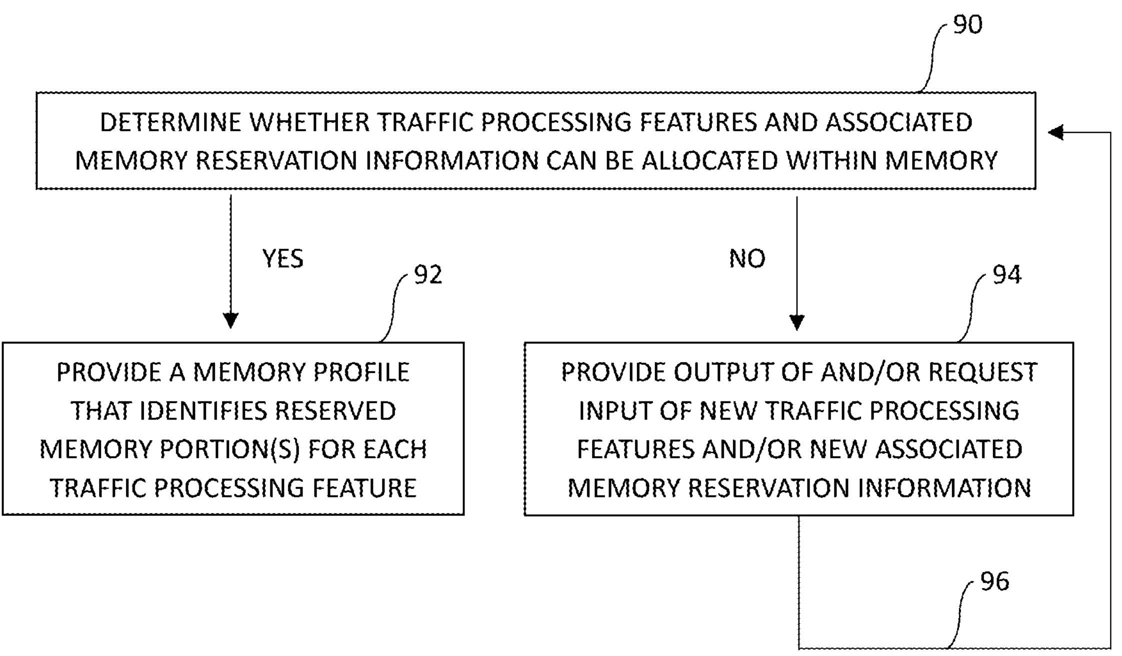
FIG. 9 is a flowchart of illustrative operations for performing memory reservation based on feasibility of input configuration in accordance with some embodiments.

In some instances, input may be received and/or output may be provided to assist in the memory reservation process, especially when memory reservation cannot be appropriately performed for a set of features and corresponding reservation parameters. FIG. 9 is a flowchart of illustrative operations for performing memory reservation based on the feasibility of the input (feature and/or reservation) configuration information (e.g., input by the user and received by the network device). In particular, these operations may be performed by one or more processors of network device 10 (e.g., processing circuitry 22 in FIG. 2) using other components of network device 10 (e.g., memory circuitry 24, interfaces 28, etc., in FIG. 2). In some configurations described herein as an illustrative example, at least some of the operations described in connection with FIG. 9 may be performed by one or more processors (e.g., of processing circuitry 22) executing software instructions stored on memory circuitry (e.g., one or more non-transitory computer-readable storage media of memory circuitry 24). If desired, one or more operations described in connection with FIG. 9 may be performed by and/or using dedicated hardware processors of network device 10.

At block 90, network device processing circuitry (e.g., processing circuitry 22, when executing process 32) may determine whether traffic processing features and associated memory reservation information (sometimes referred to as reservation parameters) can be feasibly allocated within memory (e.g., packet processor memory circuitry 30). In particular, the processing circuitry may receive the traffic processing features and the associated reservation parameters as part of configuration input (e.g., received via a command line interface from external equipment 12 in FIG. 1). Upon receiving this information, the processing circuitry may make the feasibility determination at block 90 based on the feature scale information, e.g., as described in connection with FIG. 7. In particular, the sum of the scale of the features may provide an indication of a minimum amount of memory space required to implement all of the features. In the example of FIG. 7, the sum of the scale of features 34-1, 34-2, 34-3, 34-4, and 34-5 indicates that at least nine memory slices are needed to accommodate all five features.

Accordingly, when packet processor memory such as memory circuitry 30 includes nine memory slices, the processing circuitry may determine that it is possible (but not guaranteed) to allocate all of the features using the packet processor memory, and processing may proceed to block 92.

In illustrative configurations described herein as an example, the operations performed by the processing circuitry at block 92 may be the same as those performed by the processing circuitry at block 64 in FIG. 6 (e.g., memory allocation based on the feature width, memory allocation based on feature priority, etc.). Put another way, the operations described in connection with block 90 in FIG. 9 may be performed prior to the operations described in connection with block 64 in FIG. 6 (e.g., the operations of block 90 may be performed between the operations performed at block 62 and the operations performed at block 64 in FIG. 6).

In scenarios in which the processing circuitry determines, at block 90, that all of the input features and their associated reservation parameters cannot be accommodated by the packet processor memory, processing may proceed to block 94. As one example, the processing circuitry may determine that not all of the input features can be accommodated because the memory space requirement (indicated by the combined scale of all features) exceeds the available memory slices in the packet processor memory.

At block 94, the processing circuitry may provide output containing suggestion(s) of and/or request input of new traffic processing features and associated memory reservation information. As examples, the processing circuitry may provide output (e.g., to device management equipment 12 in FIG. 1) that indicates one or more features to remove from the original features for which the determination of feasibility is performed at block 90, may request that input (e.g., confirmation) be provided (e.g., from equipment 12 in FIG. 1) to remove the one or more features, may request that new configuration input be provided (e.g., from equipment 12 in FIG. 1) indicating which of and how the original feature(s) and/or which portion(s) of the reservation information be updated, etc.

Responsive to the additional input (e.g., confirmation of recommendations output by the processing circuitry, input of a new set of features and/or new reservation information for the new set of features or the original set of features, etc.), processing may proceed back to block 90 at which the same type of feasibility determination is performed by the processing circuitry based on the new set traffic processing features and/or the new associated memory reservation information and processing may subsequently proceed to block 92 or block 94, as appropriate, based on the determination at block 90.

The methods and operations described above in connection with FIGS. 1-9 may be performed by the components of one or more network devices and/or one or more servers or other host equipment in a network using software, firmware, and/or hardware. Software code for performing these operations may be stored on one or more non-transitory computer-readable storage media (e.g., tangible computer-readable storage media) stored on one or more of the components of the network device(s) and/or server(s) or other host equipment. The software code may sometimes be referred to as software, data, instructions, program instructions, or code. The one or more non-transitory computer-readable storage media may include drives, non-volatile memory such as non-volatile random-access memory (NVRAM), removable flash drives or other removable media, other types of random-access memory, etc. Software stored on the non-transitory computer readable-storage media may be executed by processing circuitry on one or more of the components of the network device(s) and/or server(s) or other host equipment (e.g., processing circuitry of network devices, compute devices of server equipment, processing circuitry of computing devices, etc.).

The foregoing is merely illustrative and various modifications can be made to the described embodiments. The foregoing embodiments may be implemented individually or in any combination.

What is claimed is:

1. A network device comprising:

memory circuitry including a packet processor memory;

a packet processor coupled to the packet processor memory and configured to process network traffic using the packet processor memory; and processing circuitry coupled to the memory circuitry and configured to:

receive a plurality of network traffic processing features for which data is to be stored in the packet processor memory, the plurality of network traffic processing features including at least first and second network traffic processing features;

obtain memory reservation parameters for the plurality of network traffic processing features;

generate a memory reservation layout identifying memory portions of the packet processor memory to be reserved for the plurality of network traffic processing features based on the received memory reservation parameters, wherein at least a first memory portion, of the memory portions, to be reserved for the first network traffic processing feature includes one or more memory slices having a first width and wherein at least a second memory portion, of the memory portions, to be reserved for the second network traffic processing feature includes horizontally chained memory slices having a second width greater than the first width; and store the memory reservation layout in the memory circuitry.

2. The network device defined in claim 1, wherein the packet processor memory is a ternary content addressable memory having a plurality of memory slices, including the one or more memory slices and the horizontally chained memory slices, and wherein each memory slice of the plurality of memory slices has a unit width along a first dimension and a unit depth along a second dimension.

3. The network device defined in claim 2, wherein the horizontally chained memory slices are adjacent to each other along the first dimension.

4. The network device defined in claim 1, wherein the memory reservation parameters comprise an indication of feature entry width for each network traffic processing feature in the plurality of network traffic processing features.

5. The network device defined in claim 4, wherein the indication of feature entry width is based on one or more key fields associated with each network traffic processing feature in the plurality of network traffic processing features.

6. The network device defined in claim 4, wherein the memory reservation parameters comprise an indication of a number of entries for each network traffic processing feature in the plurality of network traffic processing features.

7. The network device defined in claim 6, wherein the processing circuitry is configured to determine a scale for each network traffic processing feature in the plurality of network traffic processing features based on the indication of feature entry width and the indication of the number of entries.

8. The network device defined in claim 7, wherein the processing circuitry is configured to determine a feasibility of reserving memory in the packet processor memory for the plurality of network traffic processing features using a combined scale of the plurality of network traffic processing features based on the scale for each network traffic processing feature in the plurality of network traffic processing features.

9. The network device defined in claim 4, wherein the processing circuitry is configured to determine the memory portions of the packet processor memory to be reserved for the plurality of network traffic processing features by reserving the memory portions for the plurality of network traffic processing features in an order based on feature entry width as determined by the indication of feature entry width.

10. The network device defined in claim 4, wherein the memory reservation parameters comprise an indication of priority for each network traffic processing feature in the plurality of network traffic processing features.

11. The network device defined in claim 10, wherein the processing circuitry is configured to determine the memory portions of the packet processor memory to be reserved for the plurality of network traffic processing features by reserving the memory portions for the plurality of network traffic processing features in an order based on feature entry width as determined by the indication of feature entry width and based on feature priority as determined by the indication of priority.

12. The network device defined in claim 1, wherein the plurality of network traffic processing features comprise an access control list policy feature, a quality-of-service policy feature, or a policy-based routing feature.

13. The network device defined in claim 1, wherein the packet processor and the packet processor memory are integrated in an integrated circuit die package.

14. A network device comprising:

memory circuitry including a ternary content addressable memory (TCAM);

a packet processor coupled to the TCAM and configured to process network traffic using the TCAM; and processing circuitry coupled to the memory circuitry and configured to:

receive input containing network traffic processing features and memory reservation parameters associated with the network traffic processing features, the network traffic processing features including at least first and second network traffic processing features;

generate a memory reservation layout on the TCAM for the network traffic processing features based on the received input, wherein the memory reservation layout is generated by allocating a first portion of the TCAM for the first network traffic processing feature prior to allocating a second portion of the TCAM for the second network traffic processing feature based on the first network traffic processing feature having a greater feature entry width than the second network traffic processing feature and wherein the first portion of the TCAM allocated for the first network traffic processing feature includes horizontally chained memory slices; and provide output based on the memory reservation layout, the output identifying one or more memory slices of the TCAM reserved for use by a given network traffic processing feature in the network traffic processing features.

15. The network device defined in claim 14, wherein the output comprises an indication to confirm use of the memory reservation layout on the TCAM for the network traffic processing features.

16. The network device defined in claim 14, wherein the processing circuitry is configured to receive the input and provide the output via a command line interface.

17. A network device comprising:

memory circuitry including a ternary content addressable memory (TCAM);

a packet processor coupled to the TCAM and configured to process network traffic using the TCAM; and processing circuitry coupled to the memory circuitry and configured to:

receive, from device management equipment, a plurality of network traffic processing features for which data is to be stored in the TCAM, the plurality of network traffic processing features including at least first and second network traffic processing features;

obtain memory reservation parameters for the plurality of network traffic processing features;

determine a combined scale of the plurality of network traffic processing features based at least in part on the memory reservation parameters;

determine whether a memory reservation layout that includes a reserved memory portion on the TCAM for each network traffic processing feature in the plurality of network traffic processing features can be generated based on the combined scale of the plurality of network traffic processing features, wherein the memory reservation layout includes one or more memory slices to be reserved for the first network traffic processing feature and includes horizontally chained memory slices to be reserved for the second network traffic processing feature, wherein the one or more memory slices to be reserved for the first network traffic processing feature has a first width, and wherein the horizontally chained memory slices to be reserved for the second network traffic processing feature has a second width greater than the first width; and provide output based on the determination of whether the memory reservation layout can be generated.

18. The network device defined in claim 17, wherein the processing circuitry is configured to determine whether the memory reservation layout can be generated at least in part by determining whether the TCAM contains at least an amount of memory space that can accommodate the combined scale of the plurality of network traffic processing features.

19. The network device defined in claim 17, wherein the processing circuitry is configured to:

in response to determining that the memory reservation layout cannot be generated, obtain a new plurality of network traffic processing features or a new memory reservation parameter for a given network traffic processing feature of the plurality of network traffic processing features; and generate the memory reservation layout based on the new plurality of network traffic processing features or the new memory reservation parameter.

20. The network device defined in claim 17, wherein the processing circuitry is configured to:

in response to determining that the memory reservation layout cannot be generated, output a request for a new plurality of network traffic processing features or a new memory reservation parameter for a given network traffic processing feature of the plurality of network traffic processing features.

* * * * *